United States Patent
Miller et al.

[11] Patent Number: 5,560,397
[45] Date of Patent: Oct. 1, 1996

[54] CONDUIT ASSEMBLY

[76] Inventors: Albert J. Miller, 7131 Wilson St.;
Eugene A. Miller, 7361 Garfield St.,
both of Hollywood, Fla. 33024;
William D. Greenbarg, 1054 N. North
Lake Dr., Hollywood, Fla. 33019

[21] Appl. No.: 162,502

[22] Filed: Dec. 3, 1993

[51] Int. Cl.$^6$ ............................................. F16L 57/00
[52] U.S. Cl. ..................... 138/110; 138/157; 138/162; 138/163; 174/48; 52/232
[58] Field of Search ..................... 138/103, 110, 138/172, 177, 178, 155, 157, 158, 162, 163; 174/48, 69; 52/1, 220, 232

[56] References Cited

U.S. PATENT DOCUMENTS

| | | | |
|---|---|---|---|
| 2,408,253 | 9/1946 | Diebold | 138/110 |
| 2,870,242 | 1/1959 | Wilkerson | 138/110 |
| 3,924,661 | 12/1975 | Bornhoffer | 138/110 |
| 4,258,515 | 3/1981 | Owen | 138/110 |
| 5,079,389 | 1/1992 | Nelson | 174/48 |

FOREIGN PATENT DOCUMENTS

| | | | |
|---|---|---|---|
| 1556408 | 2/1969 | France | 174/48 |
| 0074127 | 3/1991 | Japan | 174/48 |
| 612162 | 11/1948 | United Kingdom | 174/48 |

*Primary Examiner*—James E. Bryant, III
*Attorney, Agent, or Firm*—Jack E. Dominik

[57] ABSTRACT

A conduit assembly which has an inner sleeve and outer sleeve which are proportioned to be concentrically mounted, each of which has a longitudinal slot of approximately the same width is disclosed. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slop is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

8 Claims, 2 Drawing Sheets

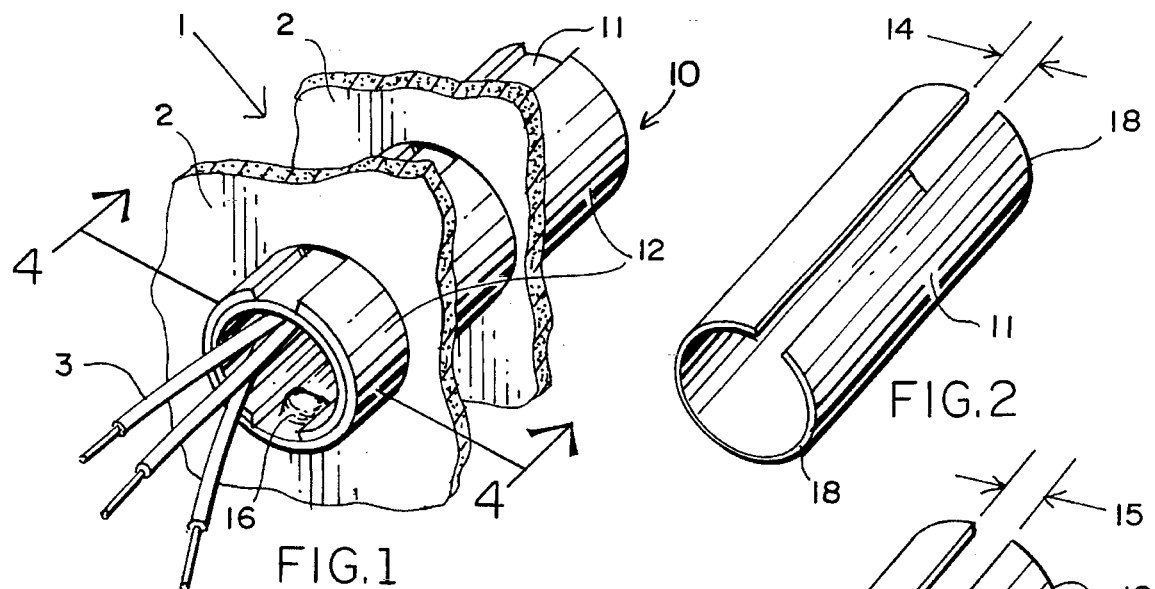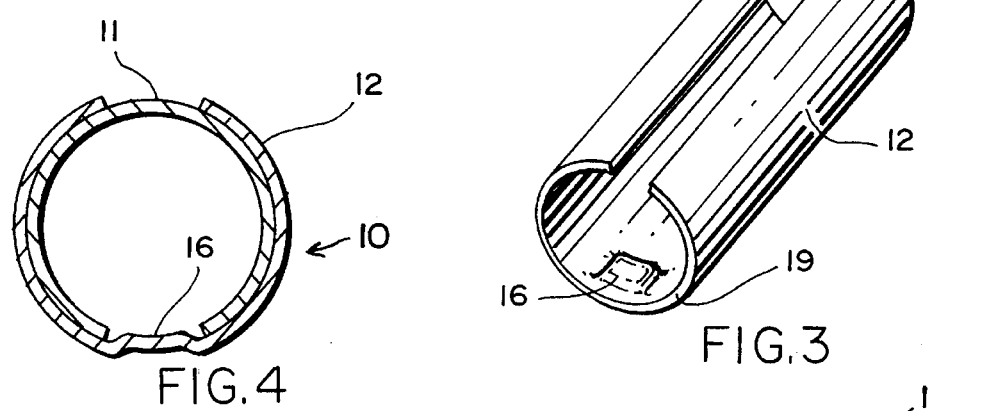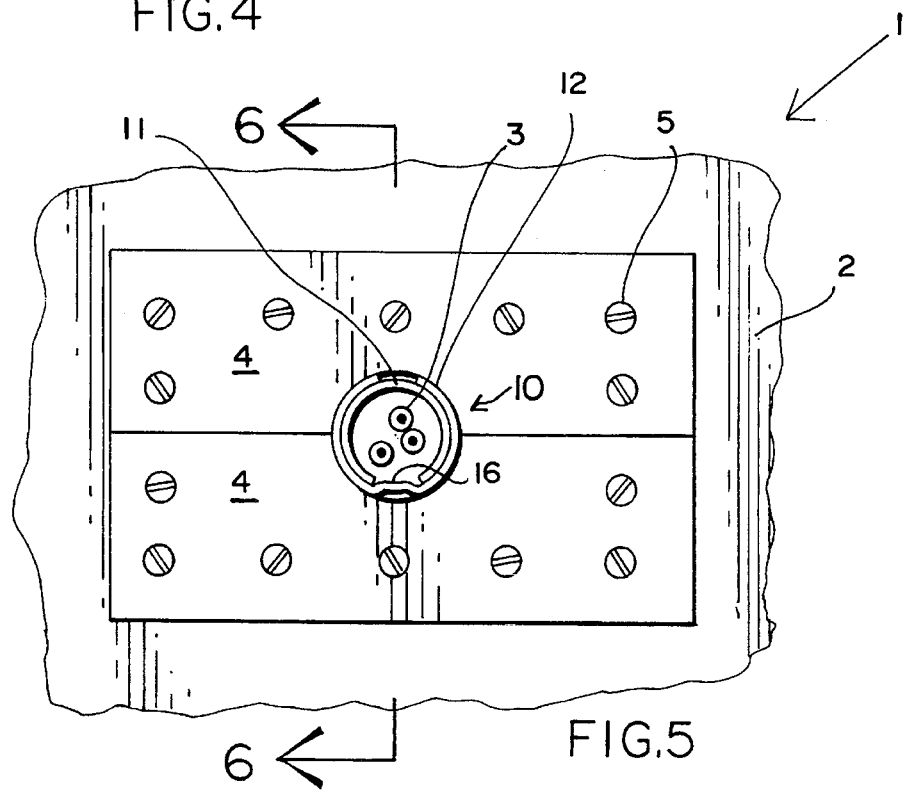

CONDUIT ASSEMBLY

FIELD OF THE INVENTION

The present invention is directed to primarily passing electrical wires through a firewall after the firewall has been erected. The invention is also directed to the method of passing the conduit through the firewall and securing the wires in place.

BACKGROUND OF INVENTION

The prior art is well represented by Nelson U.S. Pat. No. 5,079,389. It uses a wire guard for use through a stud. It is a split coupling. It does not teach the method of being able to take wires which are already in through the wall and position a safety conduit around them and then sealingly lock the same in place. Other patents, such as Hall U.S. Pat. No. 4,646,486, show a feed through fitting for a flame retardant wall. Similarly, Sack U.S. Pat. No. 4,175,593 discloses a duct for placement over an existing cable run. The Searer design U.S. Pat. No. 231,769 also shows a wire protector tube that is split to accept laying of wires. Finally, the Domigan U.S. Pat. No. 4,745,717 shows a poke through type passage of wires through a concrete floor. The subject matter is generally found classes 138, 254, 16/2, 100, and class 174. The art appears elsewhere in various constructions publications.

While we would all like to believe that construction methods in large buildings are foolproof, oftentimes wiring projects, communications projects, and others are run through a building and through a firewall with one single hole passed through the firewall but not with the firewall-type code protection which requires a conduit of code diameter penetrating the wall and extending some distance, normally one inch, and a blow out patch on either side. When such a firewall penetration is discovered, building code supervisors and others demand an immediate fix. It is possible to go in and split a tube, but even when the tube is split, there is no 360° encapsulation of the conduit. Moreover, there needs be a retrofit-type technique for passing the conduit of code thickness, encapsulating the conduit within the master conduit, and placing the blow out patch in position as well as caulking with appropriate fire proofing interiorly of the conduit through the wall, and exteriorly at the blow out patch.

SUMMARY OF THE INVENTION

The present invention is directed to a conduit assembly which has an inner sleeve and outer sleeve which are proportioned to be concentrically mounted, each of which has a longitudinal slot of approximately the same width. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slop is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

A principal object of the present invention is to provide an assembly for securing walls wired safely through a firewall even if the wires have been passed through a wall for some time and a retrofitting conform to safety standards is required.

Another object of the present invention is to provide a simple set of sleeves which can form conduit assemblies of various diameters and varying lengths to secure wires and cables passing through the fire walls.

A further object of the present invention is to provide a simple assembly which can be passed through an existing wall, and when passed through the wall and secured, form a secured fire break for the conduit.

BRIEF DESCRIPTION OF THE DRAWINGS

The present invention will be further understood as illustrative embodiment proceeds, taken in conjunction with the accompanying drawings in which:

FIG. 1 is an assembly view somewhat diagrammatically showing wires, a wall, and the subject conduit in place;

FIG. 2 is the inner sleeve of the conduit assembly;

FIG. 3 is the outer sleeve of the conduit assembly;

FIG. 4 is a transverse sectional view taken through section line 4—4 of FIG. 1 showing the relationship with the detent of the outer sleeve and the slot of the inner sleeve;

FIG. 5 is a front elevation of a blow out patch covering the assembly as shown in FIG. 1;

DESCRIPTION OF PREFERRED EMBODIMENT

Figure 6:
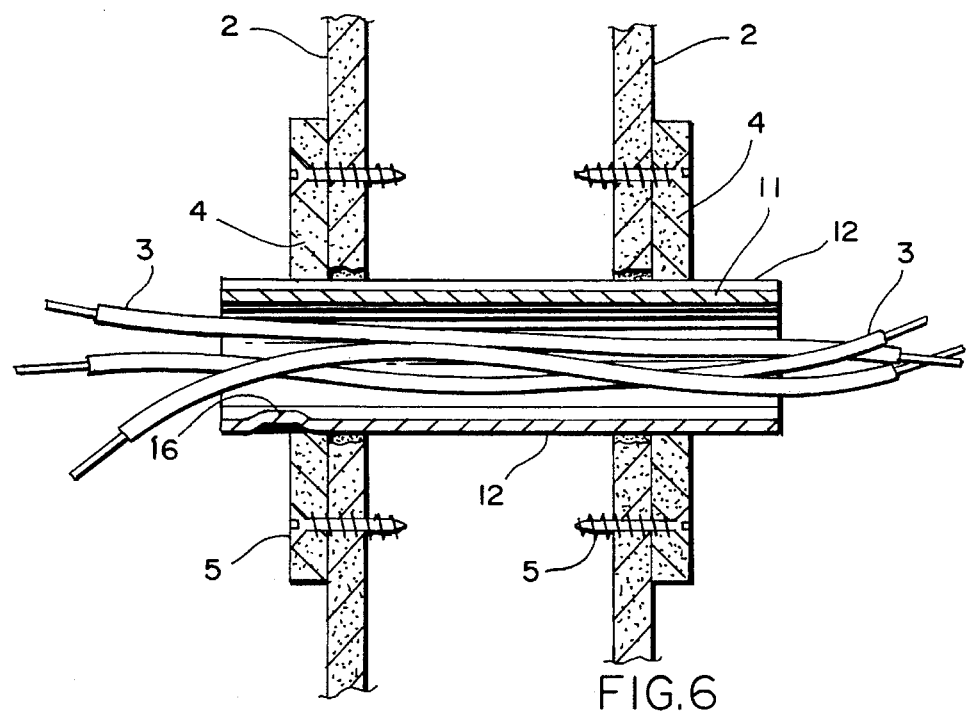
FIG. 6 is a transverse sectional view taken full length through the firewall illustrating the conduit assembly, the firewall, and the two blow out patches on either side of the firewall along with the extending tubular portion of the conduit assembly.
Figure 7:
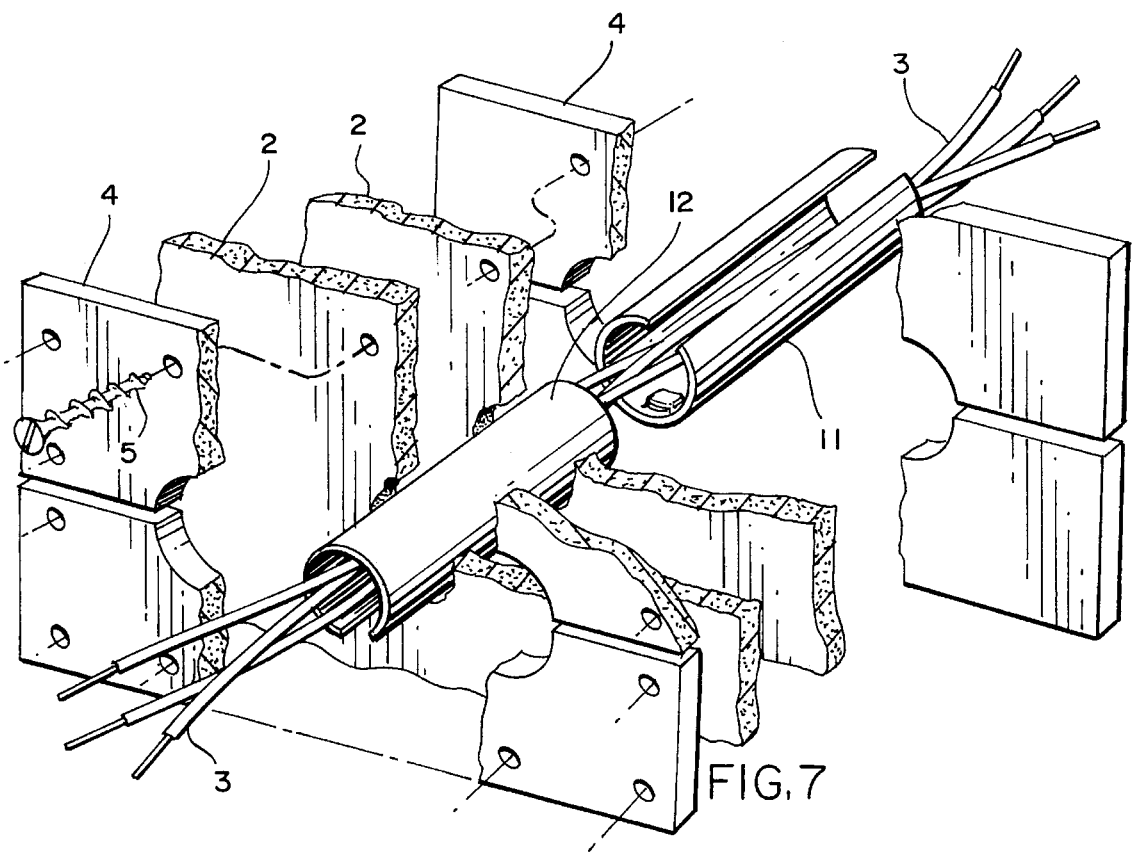
FIG. 7 is an exploded perspective view of the blow out patch shown in FIG.6.

As best shown in FIG. 1, it will be seen that the conduit assembly 10 has been passed through a firewall 1, and wires 2 have been passed through the assembly. A firewall hole 3 is the medium whereby the wires are passed. The firewall hole 3 may have been in existence when the wall was erected, or it may be drilled when various installations are in a building.

Turning now to FIG. 2, it will be seen that the inner sleeve 11 is a cylindrical conduit but with a longitudinal slot. Ideally the longitudinal slot is at least ⅜" to accommodate wires up to that thickness. Significantly larger slots may be used as will be explained later. The outside diameter of the inner sleeve 11 can vary between one inch and six inches. The two ends 18 of the inner sleeve 11 are normally transverse planes traversing the central longitudinal diameter of inner sleeve 11.

The outer sleeve 12 illustrated in FIG. 3 has outer sleeves ends 19, and a slot 15. The slot 15 in the outer sleeves is preferably the same width as width of the slot 14 the inner sleeve 11.

The outer sleeve differs from the inner sleeve primarily in that its inner diameter is sufficient to accept the outer diameter of the inner sleeve 11. Additionally, however, a locking detent 16 is provided near one end 19 of the outer sleeve 12. The detent length is approximately 3/8" (or the width of the slot of the inner sleeve slot 14) so that when the inner sleeve is rotated within the outer sleeve, the detent 16 nests within the slot 14 of the inner sleeve and lockingly engages the same in the configuration as best shown in FIG. 1. A blow out patch 4 is illustrated in FIGS. 5 and 6 which receives the conduit assembly 10. There it will be seen that interiorly of the conduit assembly a packing is supplied, and also there is a packing where the conduit assembly 10 penetrates the blow out patch, and finally the blow out patch is, in turn, sealed to the firewall.

While dimensions do not necessarily form a critical element of the invention, typical dimensions will illustrate typical proportions. Generally, various size coupling assemblies will be used. Typical examples are set forth below where diameter is involved. The length understandably is variable and need only be adequate to penetrate the firewall involved.

Generally speaking the original conduit assembly 10 will be a nominal ten foot length. Conduit assemblies 10 can then be struck to whatever lengths are necessary to penetrate the firewall. As to diameters, the conduit assembly can be a nominal interior diameter of one-half inch to six inches. Less than one-half inch would not give adequate space even for normal household wiring to be appropriately caulked and sealed. On the other hand, certain coaxial cables for heavy duty telephone systems or power systems can go as large as three or four inches. The slots in the assembly will be of sufficient width to pass whatever the wire or cable is to go interiorly of the conduit with sufficient tolerance so that it will not be scratched or cut while laying in through the longitudinal slot. In addition, to modularize the unit, the detent assembly 16 may be placed at six inch spacings. In this fashion irrespective of whether the conduit assembly is six inches or twelve inches there will be at least one detent assembly, and where the greater length is occurred augmented security results from the second detent.

As to specific details of the wall 1 it is normally made up of two panels of five eighths inch fire rated "sheet rock" shown as reference numeral 2 in FIGS. 1, 2, 6 and 7. It is also referred to as plaster board, gypsum panels, gypsum board, and is normally purchased at Home Depot or like builder supply locations in four foot by eight foot sheets. The blow out patch 4 is also sheet rock material. The blow out patch 4 is secured to the sheet rock wall portion 2 by "G" fastener screws. No pre-drilling is required. The "G" type gypsum to gypsum fastener screws are characterized by wide deep threads and are self-starting. The number of such screws 5 is usually dictated by local building code, but as shown desirably in FIG. 5, they should be on nominal three inch spacing, and surround the peripheral portion of the upper and lower halves of the blow out patch 4. A thin coating of "joint compound" is applied as a skim coat to the back side of the blow out patch 4 where it joins the wall portion 2.

The Method:

The method of the present invention contemplates the utilization of an inner sleeve and outer sleeve 11, 12 to form a conduit assembly. The first step in forming the assembly is to penetrate a wall 1 with a hole 3 to the end that wires 2 can be passed through the wall 1. The wires may have been in place for some time prior to the utilization of the method.

The inner sleeve and outer sleeve 11, 12 can be utilized together with their two slots 14, 15 in alignment to thereby receive the wires 2 and then pass the conduit assembly 10 which is made up of the inner sleeve 11 and outer sleeve 10 through the wall 1 by traversing the hole 3 in the wall.

Once the wires 2 and the conduit assembly 10 are in the desired position in the wall 1, the inner sleeve is rotated against the outer sleeve until such time as the inner sleeve slot 14 engages the outer sleeve detent 16. Thereafter the unit is picked and caulked with traditional firewall materials.

In summary, the method of the present invention involves passing a plurality of wires, connectors, or other members through a firewall comprising the steps of securing a conduit assembly of a pair of telescoping sleeves of essentially cylindrical cross-section and in essentially the same length each having longitudinal slots of approximately the same width. Once the sleeves, which are telescopingly formed, are available, a hole is formed in a firewall with a diameter slightly larger than the outer diameter of the larger sleeve. Thereafter, the wires or other connectors are passed through matched-up slots between the outer sleeve and the inner sleeve. Once the wires have been passed through the matched-up slots, the inner sleeve or outer sleeve are rotated with regard to each other until the slot of the outer sleeve is obscured by a portion of the body of the inner sleeve. Thereafter, the conduit assembly is secured to the firewall.

Although particular embodiments of the invention been shown and described in full here, there is no intention to thereby limit the invention to the details of such embodiments. On the contrary, the intention is to cover all modifications, alternatives, embodiments, usages and equivalents as fall within the spirit and scope of the present invention, specification and appended claims.

What is claimed is:

1. A conduit assembly comprising, in combination, an inner sleeve of a generally tubular cylindrical configuration and having a sleeve slot, an outer sleeve of a generally tubular cylindrical configuration having a sleeve slot and a length approximately the same of the inner sleeve, the sleeve slots in each of the inner and outer sleeve running the approximate length of the sleeve and having approximately the same arcuate spacing, said sleeves being proportioned for sliding telescoping type fit and a rotation of the inner sleeve internally of the outer sleeve resulting in a complete cylindrical shield provided about wires which are passed through the conduit assembly slots while said slots are aligned with each other defining an entry wall into the inner and outer sleeves, one of which sleeves is thereafter rotated to close the assembly, said outer sleeve having a detent extending inwardly proportioned to nestingly engage the sleeve slot of the inner sleeve, said sleeve provided with means allowing the wires to be passed through the aligned slots and the sleeves to rotate with regard to each other to shield the wires and nest the detent in the sleeve slots for subsequent fire proofing and mounting in a firewall.

2. In the conduit assembly of claim 1 above, said detent being positioned adjacent to one end of the outer sleeve.

3. In the conduit assembly of claim 2 above, said detent being positioned near the end of the outer sleeve, and having an arcuate length approximately equal to the slot in the inner sleeve to thereby receive and nestingly hold the inner sleeve.

4. In the conduit assembly of claim 1 above, said conduit assembly comprising a nominal length from which a plurality of individual assemblies can be struck, and a plurality of detents at modular spacing along said assembly spaced so that at least one detent will appear in each conduit assembly irrespective of the length which is struck.

5. In the conduit assembly of claim 1 above, said tubular members being formed from a metallic material.

6. In the conduit assembly of claim 2 above, said tubular members being formed from a metallic material.

7. In the conduit assembly of claim 3 above, said tubular members being formed from a metallic material.

8. In the conduit assembly of claim 4 above, said tubular members being formed from a metallic material.

* * * * *